(No Model.)

C. H. TAYLOR.
ROLLER FOR CORN HARVESTING, HUSKING, AND SEPARATING MACHINES.

No. 493,453. Patented Mar. 14, 1893.

WITNESSES:
Frederick Shephard
Harry L. Haskell

INVENTOR
Charles H. Taylor

UNITED STATES PATENT OFFICE.

CHARLES H. TAYLOR, OF LINCOLN, NEBRASKA.

ROLLER FOR CORN HARVESTING, HUSKING, AND SEPARATING MACHINES.

SPECIFICATION forming part of Letters Patent No. 493,453, dated March 14, 1893.

Application filed July 7, 1890. Serial No. 358,015. (No model.)

*To all whom it may concern:*

Be it known that I, CHARLES H. TAYLOR, a citizen of the United States, residing at Lincoln, in the county of Lancaster and State of Nebraska, have invented certain new and useful Rollers to be Used in Corn Harvesting, Separating, and Husking Machines, of which the following is a specification.

My invention relates to machines in which the ears of corn are separated from the stalks and husked by means of rollers; and the object of my invention is to provide a kind of roller which will not crush or shell the ears of corn when they are being snapped or separated from the stalk, or when they are being husked, and which will run the stalks, stems husks, &c., through between them with a sure and positive movement, never letting them slip and stop. I attain this object by the mechanism illustrated in the accompanying drawings, in which—

Figure 1:
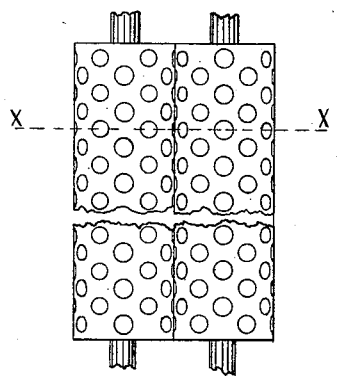
Figure 2:
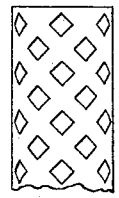
Figure 3:
Figure 4:
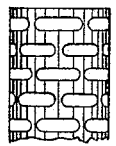
Figure 5:
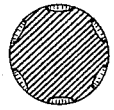
Figure 6:
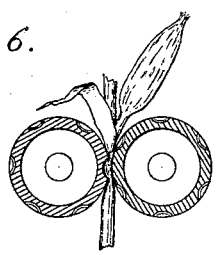

Figure 1 is a top or plan view of a pair of rollers with their surfaces provided with round indentations or cavities. Figs. 2, 3 and 4 are top views showing a few of the many different forms and plans of indentations or cavities which may be used, with about the same result. Fig. 5 is a sectional view of an indented roller taken on the line $x, x$, of Fig. 1. Fig. 6 is a cross-sectional view of a pair of indented rollers taken on the line $x, x$, of Fig. 1, and showing their action upon a stalk of corn, while running it through between them for the purpose of snapping or separating the ear from the stalk.

These rollers are constructed with their extreme outer surfaces made smooth, and on all sides of the rollers and in every portion of their surfaces, is formed indentations or cavities at short distances apart, so that there will always be one or more of the cavities in contact with each of the stalks, stems, husks, or whatever is being passed through between them. The exact size or shape of the indentations or cavities are not important points; however, I prefer round cavities about five-eighths of an inch in width, and they need not be more than three-sixteenths of an inch in depth. When the rollers are made hollow the cavities should never be made deep enough to extend entirely through the shell of the roller, as is the case with some rollers before in use, as that would allow the ends of stalks, husks, &c., to be pushed or drawn into the holes or cavities, which would cause them to wrap around the rollers.

It is not essential that the cavities should be arranged upon the surface of the roller according to any exact plan; but it is important that they should be formed in the roller's surface on all sides of it, and at short distances apart in every direction. To construct a roller with only two or three cavities running lengthwise of said roller, thus leaving wide strips of smooth surface between the cavities, would not give the desired result, as the wide strips of smooth surface would allow the stalks or other substance to stop and slip, and whenever the stalks &c. stop and the rollers begin to slip against them instead of forcing them along, then the cavities are very liable to not have the desired effect of continually forcing the stalks and other substance onward between the rollers, and the machine will immediately become choked: therefore, it will readily be seen that in order to make a successful roller (with cavities), for husking corn, or for separating (or snapping) the ears from the stalks, it is necessary that the cavities should be made quite close together in every direction, over the entire surface of the roller.

The action of indented rollers upon stalks, stems, husks, &c., while passing between them, is to cause or permit the substance between said rollers to press back into the indentations or cavities, (see Fig. 6) thus preventing said stalks, stems, husks or other substances from slipping and clogging the rollers; and the smooth outer surface between the indentations serves to prevent the ears of corn from being shelled or drawn between them and crushed.

Rollers of any size, either straight or tapering, solid or hollow, may be constructed with indented surfaces, as herein described.

In operating these rollers in pairs I have discovered that by arranging them to run together in such a way that the cavities of one roller will come opposite the smooth surface between the cavities of the other roller (see Figs. 1 and 6), a great deal better result is obtained, as their action upon the substance passing between them is very much more sure and uniform.

I am aware that rollers have before been introduced for husking corn, having a few isolated cavities formed in their surfaces, and said cavities arranged in two rows running lengthwise of each roller, leaving wide strips of smooth surface between the rows of cavities; therefore, I do not claim the use of isolated cavities in husking rollers, broadly, but

What I claim as my invention, and desire to secure by Letters Patent, is—

1. Rollers for harvesting, separating and husking corn, constructed with indentations or cavities formed in their surfaces, at short distances apart in every direction, so as not to leave any broad portions of smooth surface between the cavities, substantially as set forth.

2. Pairs of rollers for snapping or separating ears of corn from the stalks and pairs of rollers for husking corn, constructed with indentations or cavities formed in their surfaces at short distances apart in every direction so as not to leave any broad portions of smooth surface between the said indentations or cavities, and said rollers arranged to run together so that the cavities of one roller will come opposite the smooth surface between the cavities of the other roller, all substantially as set forth.

CHARLES H. TAYLOR.

Witnesses:
FREDERICK SHEPHERD,
HARRY L. MARKELL.